US006529920B1

(12) United States Patent
Arons et al.

(10) Patent No.: US 6,529,920 B1
(45) Date of Patent: Mar. 4, 2003

(54) MULTIMEDIA LINKING DEVICE AND METHOD

(75) Inventors: Barry M. Arons, Waltham, MA (US); Lisa J. Stifelman, Waltham, MA (US)

(73) Assignee: AudioVelocity, Inc., Mountain View, CA (US)

( * ) Notice: Subject to any disclaimer, the term of this patent is extended or adjusted under 35 U.S.C. 154(b) by 0 days.

(21) Appl. No.: 09/263,672

(22) Filed: Mar. 5, 1999

(51) Int. Cl.$^7$ .............................................. G06F 17/00
(52) U.S. Cl. ..................... 707/500.1; 707/512; 707/541
(58) Field of Search ................................ 707/512, 541, 707/560.1, 104.1; 382/186–189; 345/704, 720, 721, 723, 730–732

(56) References Cited

U.S. PATENT DOCUMENTS

| | | | |
|---|---|---|---|
| 3,511,509 A | 5/1970 | Firestone | 274/9 |
| 3,522,665 A | 8/1970 | Kalt et al. | 35/9 |
| 3,691,650 A | 9/1972 | Arnold et al. | 35/8 A |
| 4,178,698 A | 12/1979 | Cornell | 35/8 A |
| 4,385,461 A | 5/1983 | Wingfield | 40/352 |
| 4,422,105 A | 12/1983 | Rodesch et al. | 358/903 |
| 4,425,586 A | 1/1984 | Miller | 358/335 |
| 4,633,395 A | 12/1986 | Kuehfuss | 364/403 |
| 4,636,881 A | 1/1987 | Brefka et al. | 360/74.1 |
| 4,641,203 A | 2/1987 | Miller | 358/335 |
| 4,809,246 A | 2/1989 | Jeng | 434/317 |
| 4,841,387 A * | 6/1989 | Rindfuss | 360/72.1 |
| 4,862,497 A | 8/1989 | Seto et al. | 379/355 |
| 4,878,553 A | 11/1989 | Yamanami et al. | 178/18 |
| 4,879,557 A | 11/1989 | Roche | 341/23 |
| 4,884,974 A | 12/1989 | DeSmet | 434/317 |
| 4,924,387 A | 5/1990 | Jeppesen | 364/409 |
| D308,364 S | 6/1990 | Beasley, Jr. et al. | D14/114 |
| 4,949,999 A | 8/1990 | Ke-hui | 283/38 |
| 5,049,862 A | 9/1991 | Dao et al. | 340/706 |
| 5,191,320 A | 3/1993 | MacKay | 340/706 |

(List continued on next page.)

FOREIGN PATENT DOCUMENTS

| | | |
|---|---|---|
| DE | 196 15 986 A1 | 10/1996 |
| DE | 297 14 828 U1 | 12/1997 |
| EP | 0 752 675 | 1/1997 |
| WO | 97/18508 | 5/1997 |
| WO | 99/10834 | 3/1999 |

OTHER PUBLICATIONS

"Augmenting Real–World Objects: A Paper–Based Audio Notebook"; Stifelman; CHI–96.

Lumex LED Chips Array data sheet; Lumex Incorporated; pp. 1–2.

"Macintosh Human Interface Guidelines"; Addison–Wesley Publishing Company; pp. 158–167, 215.

(List continued on next page.)

Primary Examiner—Joseph H. Feild
(74) Attorney, Agent, or Firm—Bever, Hoffman & Harms, LLP; Jeanette S. Harms

(57) ABSTRACT

A multimedia linking device automatically links user notations (e.g., handwritten notes) made on a page to time-varying data (e.g., audio). Consequently, a user can take notes while observing a multimedia presentation, for example, and later review the notes and the corresponding segments of the recorded multimedia presentation. This dynamic linking capability also enables a user to add new notes during playback, which are automatically linked to the segment of the multimedia presentation playing when the new notes are made. Similarly, new recordings can be appended to the multimedia presentation and they will be automatically linked to corresponding user notations. The user can also stop the playback of the recording and add new notes which are automatically linked to the segment of the multimedia presentation that was playing when the playback was interrupted.

23 Claims, 9 Drawing Sheets

U.S. PATENT DOCUMENTS

| | | | | |
|---|---|---|---|---|
| 5,243,149 | A | * 9/1993 | Comerford et al. | 178/18.03 |
| 5,371,846 | A | 12/1994 | Bates | 395/157 |
| 5,407,357 | A | 4/1995 | Cutler | 434/335 |
| 5,417,575 | A | 5/1995 | McTaggart | 434/317 |
| 5,444,230 | A | 8/1995 | Baldwin et al. | |
| 5,471,043 | A | 11/1995 | Knapp et al. | 235/472 |
| 5,475,398 | A | 12/1995 | Yamazaki et al. | 345/104 |
| 5,485,176 | A | 1/1996 | Ohara et al. | 345/173 |
| 5,510,808 | A | 4/1996 | Cina, Jr. et al. | 345/123 |
| 5,532,715 | A | 7/1996 | Bates et al. | 345/123 |
| 5,535,063 | A | 7/1996 | Lamming | 360/4 |
| 5,548,106 | A | 8/1996 | Liang et al. | 235/454 |
| 5,563,955 | A | 10/1996 | Bass et al. | |
| 5,564,005 | A | 10/1996 | Weber et al. | 395/161 |
| 5,572,651 | A | 11/1996 | Weber et al. | 395/155 |
| 5,575,659 | A | 11/1996 | King et al. | 434/467 |
| 5,581,071 | A | 12/1996 | Chen et al. | 235/455 |
| 5,583,980 | A | * 12/1996 | Anderson | 345/473 |
| 5,592,607 | A | 1/1997 | Weber et al. | 395/358 |
| 5,600,777 | A | * 2/1997 | Wang et al. | 340/407.2 |
| 5,608,639 | A | 3/1997 | Twardowski et al. | 364/469.04 |
| 5,627,349 | A | 5/1997 | Shetye et al. | 178/18 |
| 5,629,499 | A | 5/1997 | Flickinger et al. | 178/18 |
| 5,630,168 | A | 5/1997 | Rosebrugh et al. | 395/825 |
| 5,631,883 | A | 5/1997 | Li | 369/31 |
| 5,640,001 | A | 6/1997 | Danielson et al. | |
| 5,655,144 | A | 8/1997 | Milne et al. | 395/807 |
| 5,661,506 | A | 8/1997 | Lazzouni et al. | 345/179 |
| 5,680,639 | A | 10/1997 | Milne et al. | 395/806 |
| 5,707,240 | A | 1/1998 | Haas et al. | 434/317 |
| 5,717,869 | A | 2/1998 | Moran et al. | 395/339 |
| 5,717,879 | A | 2/1998 | Moran et al. | 395/339 |
| 5,734,129 | A | 3/1998 | Belville et al. | 178/18 |
| 5,751,819 | A | 5/1998 | Dorrough | 381/56 |
| 5,768,607 | A | 6/1998 | Drews et al. | 395/773 |
| 5,786,814 | A | 7/1998 | Moran et al. | 345/328 |
| 5,790,114 | A | 8/1998 | Geaghan et al. | 345/326 |
| 5,803,748 | A | 9/1998 | Maddrell et al. | 434/317 |
| 5,808,286 | A | 9/1998 | Nukui et al. | 235/472 |
| 5,818,436 | A | 10/1998 | Imai et al. | 345/302 |
| 5,818,528 | A | 10/1998 | Roth et al. | 348/364 |
| 5,819,451 | A | 10/1998 | Khon | 40/352 |
| 5,838,313 | A | * 11/1998 | Hou et al. | 707/500.1 |
| 5,838,819 | A | 11/1998 | Ruedisueli et al. | 382/187 |
| 5,850,214 | A | 12/1998 | McNally et al. | 345/173 |
| 5,902,988 | A | 5/1999 | Durbin | |
| 6,138,915 | A | 10/2000 | Danielson et al. | |
| 6,149,062 | A | 11/2000 | Danielson et al. | |
| 6,164,545 | A | 12/2000 | Danielson | |
| 6,167,439 | A | * 12/2000 | Levine et al. | 709/217 |
| 6,259,043 | B1 | * 7/2001 | Clary et al. | 178/18.01 |
| 6,330,976 | B1 | * 12/2001 | Dymetman et al. | 235/487 |

OTHER PUBLICATIONS

"Texas Instruments TSL 1401 Data Sheet 128 X 1 Linear Sensor Array"; Texas Instr. 1996: pp. 1–6.

"The Bar Code Book"; Palmer: Chapters 4, 6, & Appendix A.

"The World Through The Computer: Computer Augmented Interaction With Real World Environments"; Rekimoto et al.; UIST'95 Nov. 14–17, 1995: pp. 29–36.

"Tricolor Programmed Bar Graph Display"; Series 3 Data Sheet; Cariger Inc.; 4 pages.

"Uniform Symbology Specification Interleaved 2–of–5"; ANSI Aug. 16, 1995.

"Voice Communication With Computers Conversational Systems"; Schmandt; 1994; Chap. 4 & 12.

G. D. Abowd, C. G. Atkeson, A. Feinstein, C. Hmelo, R. Kooper, S. Long, N. Sawhney and M. Tani. Teaching and Learning as Multimedia Authoring: The Classroom 2000 Project. In Proceedings of ACM Multimedia 96, pp. 187–198. 1996.

T. Arai, D. Aust, S.E. Hudson, PaperLink: A Technique for Hyperlinking from real Paper to electronic Content, pp. 327–334, ACM, 1997.

G. Cruz and R. Hill. Capturing and Playing Multimedia Events with Streams. In Proceedings of ACM Multimedia 1994, pp. 193–200, ACM, 1994.

M. Davis, Media Streams: An Iconic Visual Language for Video Representation, 18 pages.

L. Degen, R. Mander and G. Salomon. Working with audio: Integrating personal tape recorders and desktop computers. In Proceedings of CHI '92, pp. 413–418. ACM, 1992.

R. Kazman, R. Al–Halimi, W. Hunt and M. Mantei. Four Paradigms for Indexing Video Conferences. *IEEE Multimedia*, 3(1):63–73, 1996.

D. G. Kimber, L. D. Wilcox, F. R. Chen and T. P. Moran. Speaker Segmentation for Browsing Recorded Audio. In Proceedings of CHI '95, pp. 212–213, ACM, 1995.

Lamming, M. G. Towards a Human Memory Prothesis. Rank Xerox EuroParc Technical Report, 1991.

S. Minneman. S. Harrison, B. Janssen, G. Kurtenbach, T. Moran, L. Smith and W. van Melle. A Confederation of Tools for Capturing and Accessing Collaborative Activity. In Proceedings of ACM Multimedia 95, pp. 523–534, ACM, 1995.

T. P. Moran, L. Palen, S. Harrison, P. Chiu, D. Kimber, S. Minneman, W. van Melle and P. Zellweger. "I'll Get That Off the Audio"; A Case Study of Salvaging Multimedia Meeting Records. In Proceedings of CHI '97, pp. 202–209. ACM, 1997.

Mossberg, Walter S. The CrossPad Sends Paper–and–Ink Notes To Your PC Screen. Wall Street Journal, Apr. 9, 1998, p. B1.

J.R. Rhyne, C.G. Wolf, Tools for Supporting the Collaborative Process. IBM Thomas J. Watson Research Center, Yorktown Heights, NY, pp. 161–170, 1992.

Stifelman, Lisa J. Augmenting Real–World Objects: A Paper–Based Audio Notebook. In the Proceedings of CHI '96. ACM–SIGCHI, 1996.

Stifelman, Lisa J. The Audio Notebook: Paper and Pen Interaction with Structured Speech. Doctoral Dissertation. Massachusetts Institute of Technology, Sep. 1997.

K. Weber and A. Poon, Marquee: A Tool for Real–Time Video Logging. In Proceedings of CHI '94, pp. 58–64, ACM, 1994.

Whittaker, Steve et al. Filochat: Handwritten Notes Provide Access to Recorded Conversations. In the Proceedings of CHI '94, pp. 271–277, ACM–SIGCHI, 1994.

Wilcox, Lynn. et al. Dynomite: A Dynamically Organized Ink and Audio Notebook. In the Proceedings of CHI '97, pp. 186–193. ACM–SIGCHI, 1997.

* cited by examiner

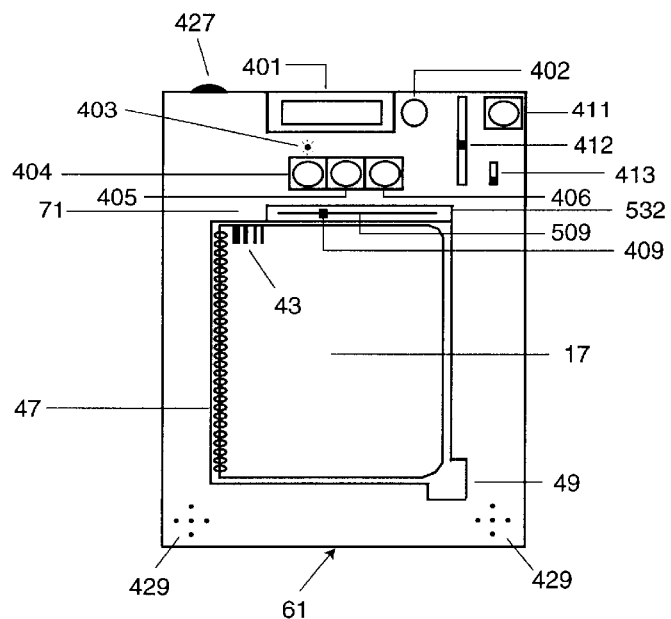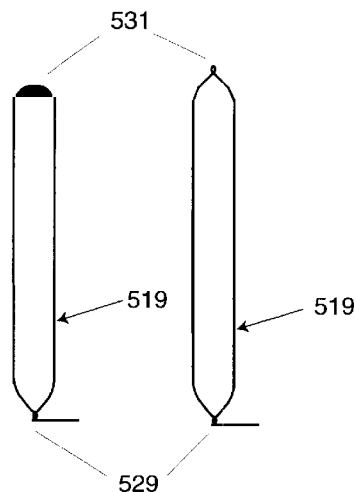
Figure 1A
Figure 1D
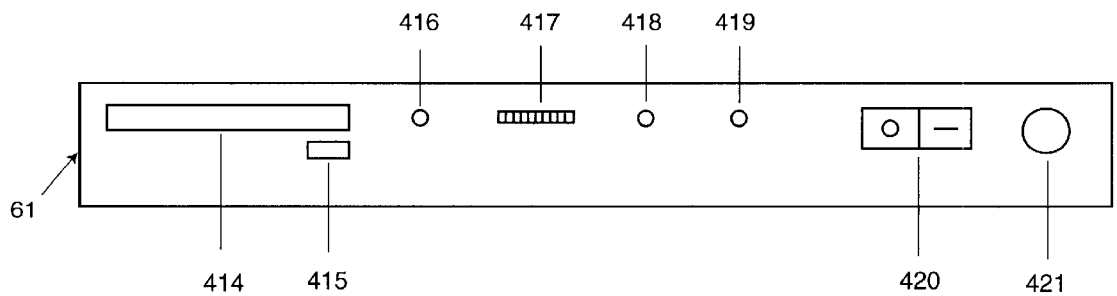
Figure 1B
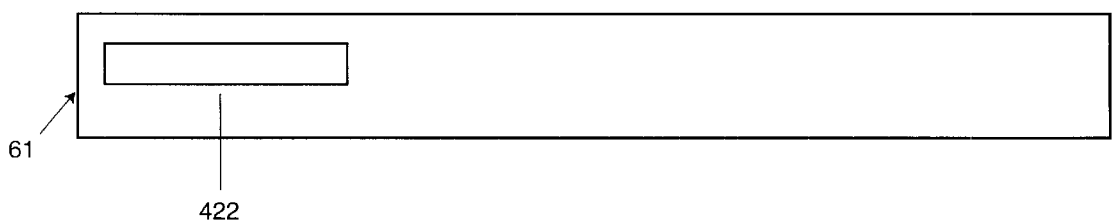
Figure 1C

MULTIMEDIA LINKING DEVICE AND METHOD

RELATED APPLICATIONS

This application claims priority to U.S. Provisional Applications, Ser. Nos. 60/077,061, 60/077,066, 60/077,067, 60/077,078 and 60/077,098, which were filed on Mar. 6, 1998. In addition, this application incorporates by reference copending U.S. applications entitled, Active Physical Scrollbar for Controlling and Displaying Information, Ser. No. 09/263,003, pending, and Page Identification System and Method, Ser. No. 09/263,978, pending, filed on even date herewith.

FIELD OF THE INVENTION

The invention relates generally to information processing devices and processes. In particular, the invention relates to information processing devices and processes that automatically link user notations on a page to time-varying data (e.g., handwritten notes linked to a corresponding audio presentation).

BACKGROUND OF THE INVENTION

The present invention addresses the problem of trying to capture and later review orally presented information (e.g., lecture, meeting, interview, telephone call, conversation, etc.). A listener must simultaneously attend to a talker while attempting to write notes about what is said. A tape recorder can capture exactly what and how things are said, however, it is time consuming and often frustrating to find information on a tape. A user must shuttle between fast forward and rewind to find the portions of interest on the tape. It is difficult to skim through a recording or correlate it with one's handwritten notes.

Systems that capture writing on paper or a document but do not record audio or video include: U.S. Pat. Nos. 5,629,499 to Flickinger et al. ("Flickinger"); 5,734,129 to Belville et al. ("Belville"); 5,627,349 to Shetye et al. ("Shetye"); and 5,243,149 to Comerford et al. ("Comerford") and the Cross-Pad (described in Mossberg, Walter S. The CrossPad Sends Paper-and-Ink Notes To Your PC Screen. Wall Street Journal, Apr. 9, 1998, p. B1).

There are graphical computer playback applications that allow a user to select a single point in an audio or video recording (e.g., by positioning a cursor in a visual representation of the media) and then type in a keyword(s) (U.S. Pat. Nos. 5,786,814; 5,717,879; and 5,717,869; and Cruz et al. Capturing and Playing Multimedia Events with STREAMS. In Proceedings of ACM Multimedia 1994, pages 193–200. ACM, 1994). As described in Degen et al. Working with audio: Integrating personal tape recorders and desktop computers. In Proceedings of CHI '92, pages 413–418. ACM, 1992, a user manually creates an index or "marker" during recording by pressing one of two buttons on a tape recorder and these marks are then displayed graphically. These systems have limited utility because they rely on the user to manually index the recordings.

Similarly, U.S. Pat. Nos. 5,592,607 and 5,564,005 describe a system where a user indexes a video recording by manually creating "time zones". A time-zone is created by drawing a line across the screen. There is a single time point in the video (the time the line was drawn) associated with the area of the screen below this line until the next line is drawn. Users can write notes with a stylus. Individual pen strokes (i.e., handwritten notes) do not index the video—the strokes are located inside a time zone which corresponds to the instant that the time zone was created. Additional writing can be added to a time zone at any time but this does not create any new indices into the recording. This system has many disadvantages. Instead of leveraging the natural activity of the user, this system enforces one particular behavior—drawing a line across the screen to manually create an index into the recording. The granularity of indices is limited since each time zone only relates to a single time point in a recording, and individual pen strokes do not index the recording.

Some systems attempt to automatically generate indices into recorded media using signal processing techniques. For example, some systems have attempted to segment recordings by speaker changes (e.g., speaker A started talking at time t1, speaker B at time t2, etc.) as described in Kimber et al. Speaker Segmentation for Browsing Recorded Audio. In Proceedings of CHI '95, pages 212–213. ACM, 1995.

Some systems use handwritten notes taken during recording to index audio or video. U.S. Pat. No. 4,841,387 describes a system that indexes tape recordings with notes captured during recording. The writing surface is an electronic touchpad. All indices are created during recording only and stored in a reserved portion at the beginning of a microcassette tape. The user cannot add notes that index the recording during playback. The display surface is grouped into rectangular areas to save storage space; this has the disadvantage of making the system coarser grained than if each mark or pen stroke was indexed. In addition, a user has to put the device in a special "review mode" (by pressing a button) before being able to select a location in the notes for playback. Other systems index audio and/or video recordings with notes handwritten on a computer display screen or electronic whiteboard during recording (U.S. Pat. Nos. 5,535,063; 5,818,436; 5,786,814; 5,717,879; and 5,717,869, as described in Whittaker, Steve et al. Filochat: Handwritten Notes Provide Access to Recorded Conversations. In the Proceedings of CHI '94, pages 271–277, ACM-SIGCHI, 1994, and as described in Wilcox, Lynn. et al. Dynomite: A Dynamically Organized Ink and Audio Notebook. In the Proceedings of CHI '97, pages 186 193, ACM-SIGCHI, 1997).

Systems described in Stifelman, Lisa J. Augmenting Real-World Objects: A Paper-Based Audio Notebook. In the Proceedings of CHI '96. ACM-SIGCHI, 1996 ("Stifelman 1996") and Stifelman, Lisa J. The Audio Notebook: Paper and Pen Interaction with Structured Speech. Doctoral Dissertation. Massachusetts Institute of Technology, Sep. 1997 ("Stifelman 1997") index digital audio recordings with notes written in a paper notebook during recording. Some limitations of these systems are as follows. Like the previous systems just described, Stifelman (1996) and Stifelman (1997) focused on real-time indexing—a limitation is that notes written during playback do not index the recording. A further problem is the issue of distinguishing writing activity from selections made for playback. In Stifelman (1996) and Stifelman (1997), if a user adds to their notes when in a play mode, this could falsely trigger a playback selection. Also, selections left visible marks on the pages. With systems that use a display screen as the writing surface instead of paper, sometimes a circling gesture or other gesture is used to select areas of writing for playback. This can also be error-prone because the system has to distinguish between a circle drawn as data versus a circling gesture or else the user must put the system in a special mode before making the gesture, causing selection to be a two-step procedure.

OBJECTS AND ADVANTAGES OF THE INVENTION

The present invention offers several advantages over the art. The objects and advantages of the invention include the following. One object of the invention is to allow a user to index time-varying media (audio, video, etc.) while recording, while playing, or while stopped. Another object is for the indexing to be automatically created from natural activity (e.g., user notations such as handwritten notes and page turns) of the user during recording and playback, and that these indexes can be created in a continuous fashion while the recording is originally being made or while it is being played back, or when stopped. Still another object is to allow the indices to be dynamically updated with new indices added during playback, while creating additional recordings, or while stopped. Yet another object is to allow a user to create multiple indices for any part of a recording. Another object of the invention is to allow a user to add new recorded segments of audio, video, etc. for any page of data.

Another object of the invention is to reliably distinguish between user notations created to index the recording and selection actions that are intended to cue playback to a location associated with a user notation. Still another object of this invention is to allow this distinction to be made without requiring a user to explicitly instruct the device to enter a special "mode", and that only a single step or action is needed to make a selection. Another object is for the selection action to be intuitive and not require training or reading a manual to learn. Yet another object is to allow a single input device to be used both for making notations and selections, and without creating unwanted marks.

SUMMARY OF THE INVENTION

In a multimedia notebook recording application, a real-time continuous stream of media such as audio and/or video is recorded and linked with handwritten notes, other notations, or other types of indexing information (referred to as "user notations" or simply "notations"). Such an application or device will be referred to as a "multimedia recorder". This indexing information can then be used to cue a recording to a location corresponding to the user notation.

The present invention describes a multimedia recording device that combines the best aspects of a paper notebook and a media recorder (i.e., for recording audio, video, music or other time-varying media). The device can be used to record and index interviews, lectures, telephone calls, in-person conversations, meetings, etc. In one embodiment, a user takes notes in a paper notebook, and every pen stroke made during recording, playback, or while stopped is linked with an audio and/or video recording. In other embodiments, the writing medium could be a book, flip chart, white board, stack of sheets held like a clip-board, pen computer, etc. (hereinafter referred to as a "book"). Hereinafter, the term "page" generically refers to planar surfaces such each side of a leaf in a book, the book cover, a surface below the book, a touch sensitive surface, a sheet of paper, flip chart, image on a screen, whiteboard, etc.

For playback, users can cue a recording directly to a particular location simply by turning to the corresponding page of notes. An automatic page identification system recognizes the current page, making it fast and easy to navigate through a recording that spans a number of pages of data. Users can select any word, drawing, or mark on a page to instantly cue playback to the time around when the mark was made. A selection is made using a "stylus", where stylus is defined as a pen (either the writing end of a digitizing pen or the selecting end of a digitizing pen), finger, or other pointing mechanism. The multimedia recorder is able to reliably distinguish between user notations that index the recording and selections intended to trigger playback.

More particularly, the invention links a user notation (e.g. handwritten notes) on a page to time-varying data (e.g. audio). The invention includes a user interface for capturing attribute data for each user notation made on the page during record-time and play-time, a recording device for recording the time-varying data corresponding to the attribute data for each notation, and a processor for dynamically linking the attribute data to a corresponding element of the time-varying data.

The user interface can for example include a stylus for making and selecting a user notation and a digitizing tablet or other sensing device for capturing the attribute data for each user notation. The attribute data can include pressure information from the stylus corresponding to the pressure applied by the writing end of the stylus when making the notation onto the page, location information corresponding to the location of the stylus when making the notation, time information for when each user notation was made, and index-type information (e.g. play-time, record-time, and stop-time). The stylus can include both a writing end for making the notation onto the page and a selection end for selecting a user notation and thereby selecting the corresponding time-varying data to reproduce.

The recording device can include a sensory device (e.g., a microphone, telephone output, digital camera, television output, etc.) for receiving the time-varying data and a storage device (e.g., a hard disk, removable disk, etc.) for storing the time-varying data.

The processor is coupled to the sensing device (e.g., a digitizing tablet), the recording device, and a memory (where the attribute data is stored) for dynamically linking the attribute data for a particular user notation to the corresponding time-varying media that was recorded or reproduced at the same time that the user notation was made.

During record-time, the invention records the time-varying data and the attribute data for each user notation and links the attribute data to a corresponding element of the time-varying data. When the user wants to review these notes and listen to the corresponding time-varying data, i.e. during play-time, the user selects the user notation desired with a selection end of the stylus and the system automatically plays/reproduces the recorded time-varying data (e.g., audio). The user can then add additional notations to the page while the time-varying data is being played and the invention will automatically link these new notations to the time-varying data. The user can also stop the recorder and make notations on the page at her leisure (i.e. during stop-time). These stop-time notations will be automatically linked to the time-varying data that was playing when the playback was stopped.

BRIEF DESCRIPTION OF THE DRAWINGS

This invention is defined by the claims below. The advantages of this invention however, may be better understood by referring to the following description taken in conjunction with the accompanying drawings, in which:

FIG. 1A shows a top view of the multimedia recorder with associated components.

FIG. 1B shows a right side view of the multimedia recorder with associated components.

FIG. 1C shows a left side view of the multimedia recorder with associated components.

FIG. 1D shows several embodiments of a stylus for use with the multimedia recorder.

DETAILED DESCRIPTION OF THE INVENTION

Figure 2:
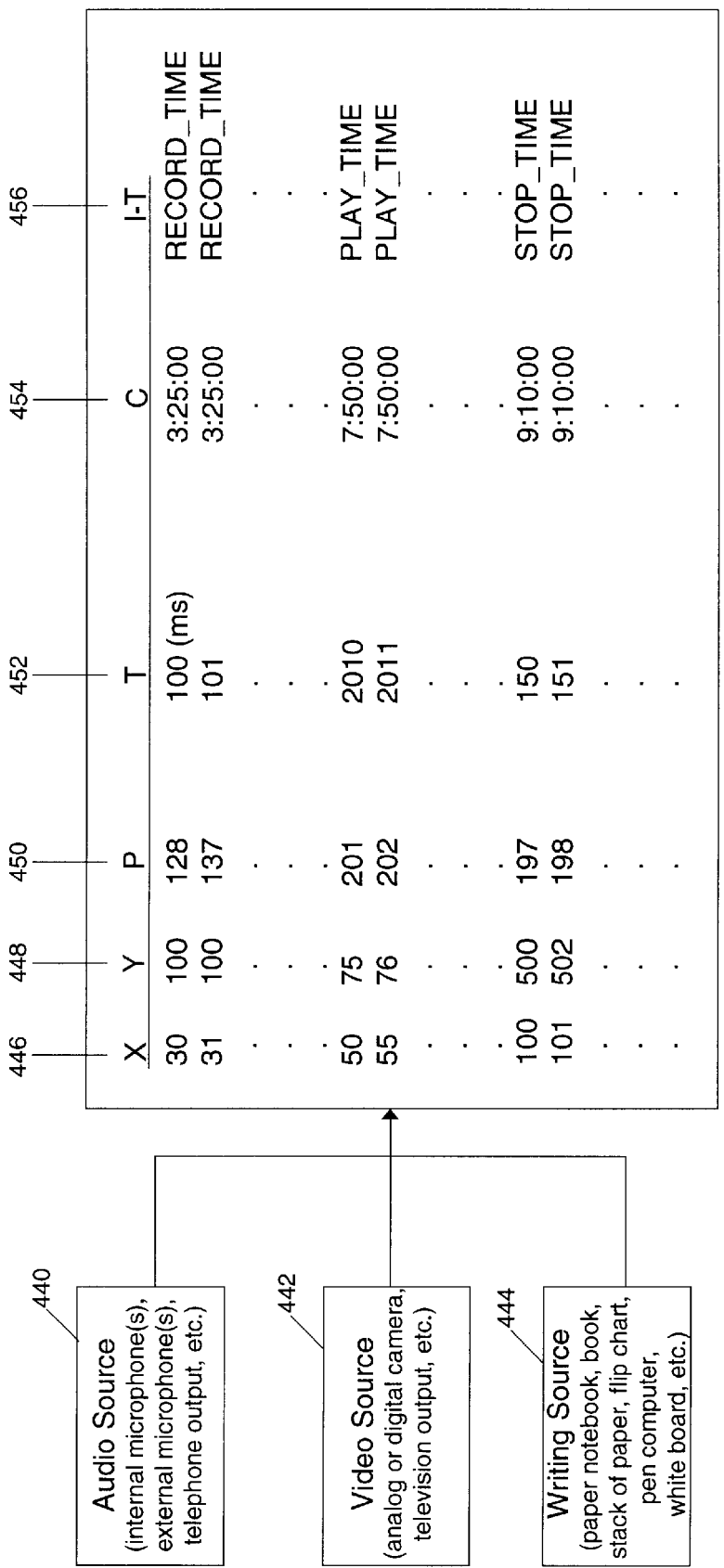
FIG. 2 shows data captured by the multimedia recorder.

FIGS. 1A–1C show a schematic representation of one embodiment of a multimedia recorder 61. FIG. 1A shows a top view, FIG. 1B shows a right-side view, and FIG. 1C shows a left side view.

A status display 401 shows messages such as a recording level meter, the page number, the disk space, battery level, etc. The status display 401 can be angled for easy viewing by users who are seated or holding the device in their arms or lap.

A backlight button 402 is provided for turning on and off a backlight for the status display 401. Pressing the backlight button 402 once turns the backlight on; pressing the backlight button 402 again, turns the backlight off. The backlight can also be turned on and off under software control by the system. For example, the system flashes the backlight to call the user's attention to the display such as when the battery or disk space are running low.

A record LED (light emitting diode) 403 is turned on whenever recording is taking place and is turned off when recording is terminated. In one embodiment, the record LED 403 is red and located adjacent to the record button 404.

General Description of Buttons

Components 404–406 are the record button 404, play button 405, and stop button 406. Each of these buttons has a depression in the center. The depression allows the button to be pushed with either a finger, or stylus. A user can write with one hand, and push buttons with the other. Alternatively, allowing buttons to be pushed with the stylus is convenient for one-handed operation when the user is already holding the stylus.

Paper Book

In one embodiment, the device links notes written in a paper book 17 with a digital audio recording. In other embodiments, the writing medium could be a book, flip chart, white board, stack of sheets held like a clip-board, pen computer, etc.

The user places the book 17 on the surface of the device inside a book holder 47. This component is designed to hold the book 17 over the recorder's writing area. All user notations in the book (writing, drawings, etc.) are accurately captured and digitally stored by the device. The notations are captured through the thickness of the book 17. In this embodiment, the book 17 is thirty pages but could be fifty or more pages in other embodiments.

The cover and each page of the book 17 has a printed page identification code 43. A code is also printed on the surface of the multimedia recorder 61. In one embodiment, the cover code is used to detect whether a book 17 is on the device, and the page code 43 identifies the page number. In other embodiments, these codes could be used to store other kinds of information about the book or page (e.g., a code that uniquely identifies the book as well as the page, the format of a page, etc.).

Page Identification System

In one embodiment a page identification system 71 is located adjacent to the top edge of the book 17. The design of the page identification system 71 allows it to read a page code 43 printed on the pages, cover, or surface below the book 17 without being directly over the page code 43. This has the advantage of allowing pages to be turned easily without removing the book 17 from the multimedia recorder 61. Since the page identification system 71 is adjacent to, rather than over, the page, it does not interfere with making notations on the page. The book holder 47 is positioned so that the page code 43 will be positioned in front of the page number identification system 71. An opening in the corner of the book holder 49 allows easy page turning.

The page identification system 71 can be placed along any edge of the book 17. In one embodiment, the placement of the page identification system 71 (and the page code 43) are optimized for use with a left-bound book so it does not get in the way of a user's hand while making notations.

Making a Recording

In one embodiment, to start recording, a user simply presses the record button 404. Whenever the device is recording, the record LED 403 is turned on. A level meter is displayed on the status display 401 which shows the level of input received by the system (i.e., the louder the input signal, the higher the meter level). This allows a user to confirm that audio (or video, etc.) is being properly received by the device. A user can stop recording at any time by pressing the stop button 406. When the stop button 406 is pressed, the record LED 403 is turned off and the status display 401 shows how much was recorded (such as in hours, minutes, and seconds).

Microphones

In one embodiment, one microphone 427 is built into the device, and there are two external microphone inputs (418 and 419). In this embodiment, one of the external microphone inputs 418 overrides the device's built-in microphone. This allows a variety of different microphones to be used with the system (e.g., table-top for meetings, close-talking lavaliere, wireless for remote operation, etc.). In other embodiments, an external video or still camera could be plugged into the device as well. Also, additional microphone inputs could be provided in other embodiments.

The device senses when a microphone has been inserted or removed from an input jack (418 and 419). This way the device automatically knows how many channels to record and the number of channels does not have to be manually input. In addition, the device warns users if they attempt to make a recording when no microphone is plugged into the device. When a microphone is inserted or removed from the device, feedback is given on the status display 401 acknowledging the action.

Each microphone signal is stored as a separate channel or track. Each channel can then be played back separately or mixed together (see Play Channel selector 413). In another embodiment, the device can also have a jack for line level input. This allows the device to receive input, for example, from an external system where the microphones are already amplified to line level.

The device can also record over the telephone. In one embodiment, a cable can be used to plug into the telephone handset on one end, and into the microphone input (418 or 419) on the device on the other. In another embodiment, the device has its own telephone input jacks for directly plugging in a telephone and telephone handset (or the device could have one telephone input jack and provide a cable for splitting between the telephone and handset).

Speakers/Headphones

In one embodiment, there are two built-in speakers 429 for stereo output. In this embodiment, there is also an input jack for plugging in external speakers or headphones 416. Plugging in external speakers or headphones overrides the built-in speakers 429, so the output is only heard from the external source. Similar to the microphone inputs (418 and 419), the device also senses when external speakers or headphones have been plugged in to the external speaker/headphone jack 416, and provide feedback to the user accordingly.

A volume control 417 is provided for adjusting the output level of the sound. This volume control 417 does not directly control the volume of the sound output, but instead sends a signal to the processor 101 which then instructs the program running on the host computer 103 to adjust the volume in software.

Data Captured at Record-Time, Play-Time, and Stop-Time

A listener can write notes that index a recording while the recording is being captured (referred to as record-time indices), during playback (referred to as play-time indices), or when the system is idle or stopped, i.e., not playing or recording (referred to as stop-time indices). In some cases, during recording, users may make only a few notes, because they are focusing their attention on a live presentation. After recording, a user may want to add to their notes while playing it back. In the present invention, the notes written during playback (or when stopped) are dynamically added to the indices already stored during recording. In the extreme case, a user does not have to write any notes during recording at all. The notes can be written while playing back the recording, and every mark made during playback will index the material being played in the same manner as if it were being heard live. The user interface is consistent for all three types of indices (record-time, play-time, and stop-time)—the notes always index whatever the user is currently listening to (or just listened to before stopping) whether the user is listening to the material live or after the fact. Stop-time indices allow a user to write a note that indexes what they just heard before stopping playback or recording.

FIG. 2 shows some sample data captured for each page of notes for one embodiment of a multimedia recorder. There are many different possible sources of data. Some examples are shown in the figure: an audio source 440 (speech, music, or other sound from a microphone, telephone, radio, etc.), a video source 442 (analog or digital video from an internal or external camera, video system, television output, etc.), and a writing source 444 (from a paper notebook, book, stack of paper, flip chart, white board, pen computer, etc.). Note that this is not an exhaustive list and there are other possible sources of input.

In one embodiment, the recordings are segmented and stored by page. Each page of notes has an associated recording. The recording can be stored in a file, in memory, on a tape, etc. This will be referred to as a "memory location" or file. In one embodiment, newly recorded data is appended to a file for the currently open book 17 page. For example, consider the case where a user is opened to page one for the first ten minutes of a lecture, and then turns to page five for ten minutes, and then turns back to page one for five minutes. The first ten minutes of the lecture plus the last five minutes of the lecture will be stored in the page one file; the ten minutes in between will be stored in the page five file. Recording can be started and stopped as many times as desired. A new recording can be added to any page of notes at any time. For example, in one embodiment, if a user wants to add another recording to page ten, the user simply turns to page ten and presses record. Each additional recording is appended to the recorded data already stored for the associated page of notes.

FIGS. 3 and 4A–4D show attribute data for the recordings stored in a link table 478. The link table 478 is representative of the types of attribute data that can be stored. The link table 478 can be stored in a file, in RAM, in an in-memory data structure, etc. In the link table 478:

"X" 446 represents the X coordinate of the stylus data or other event data;

"Y" 448 represents the Y coordinate of the stylus data or other event data;

"P" 450 represents the pressure of the stylus on a page or other event data; and "T" 452 represents the time offset into the recording.

The term "time offset" will be used to mean an offset, time stamp, time code, frame code, etc., into a recording for an event. The time offset can represent a time relative to the beginning of the recording, or other event. In some embodiments, this time offset may be fine grained, and represent intervals such as one millisecond, or a single video frame (1/30 of a second, 33.3 milliseconds). In FIGS. 4A through 4D, the time offset is the number of milliseconds from the beginning of the recording.

"C" 454 represents the absolute date and clock time when the X-Y point or other event occurred (for example the number of seconds since some pre-determined epoch, such as 00:00 Jan. 1, 1970).

"I-T" 456 represents the index type, or flags associated with the entry into the link table. For example the flags can represent if the data was captured at record time, play time, or stop time. Other data can be stored in this field, such as an indication of a page turn, starting or stopping of a recording, etc. For example, a code indicating the page was turned to another page (TURNED_TO flag), or turned to this page from another page (TURNED_FROM flag) is stored in this field. In this case, the number of the page (turned to or turned from) is stored in the X field. Note that in some embodiments, these flags can be logically OR'd together (such as a page TURNED_TO flag OR'd with a RECORD_TIME flag).

The stylus data is always captured by the multimedia recorder 61—when the device is recording (referred to as record-time), when the device is playing (referred to as play-time), and when the device is stopped (referred to as stop-time). In some embodiments, only a subset of this attribute data may be used, while in other embodiments, additional information may be captured (such as the tilt of the stylus, color of the ink used in the stylus, etc.).

The multimedia recorder 61 captures a complete spatial map of all information written on each page. This includes every X-Y point (446, 448) that makes up every stylus stroke, as well as a pressure reading 450 from the stylus. The stylus pressure data 450 is used to determine stylus ups and downs (i.e., when the stylus was placed down on a page, and when it was picked up). The stylus data can be used to very accurately render the pages of notes as images on a computer screen and for high quality printing of the book pages for filing, faxing, etc. The data can be converted to PostScript, a GIF image, or other format. Each X-Y point (446, 448) that makes up each letter, word, or drawing acts as an index into the recording. Each X-Y point (446, 448) indexes the location in the recording that was being recorded or played back at the time the stroke was made, or if the system is stopped, the last portion of the recording that was played or recorded prior to stopping. In other embodiments where video is used, a video time code could also be stored for every X-Y point (446, 448).

Figure 3:
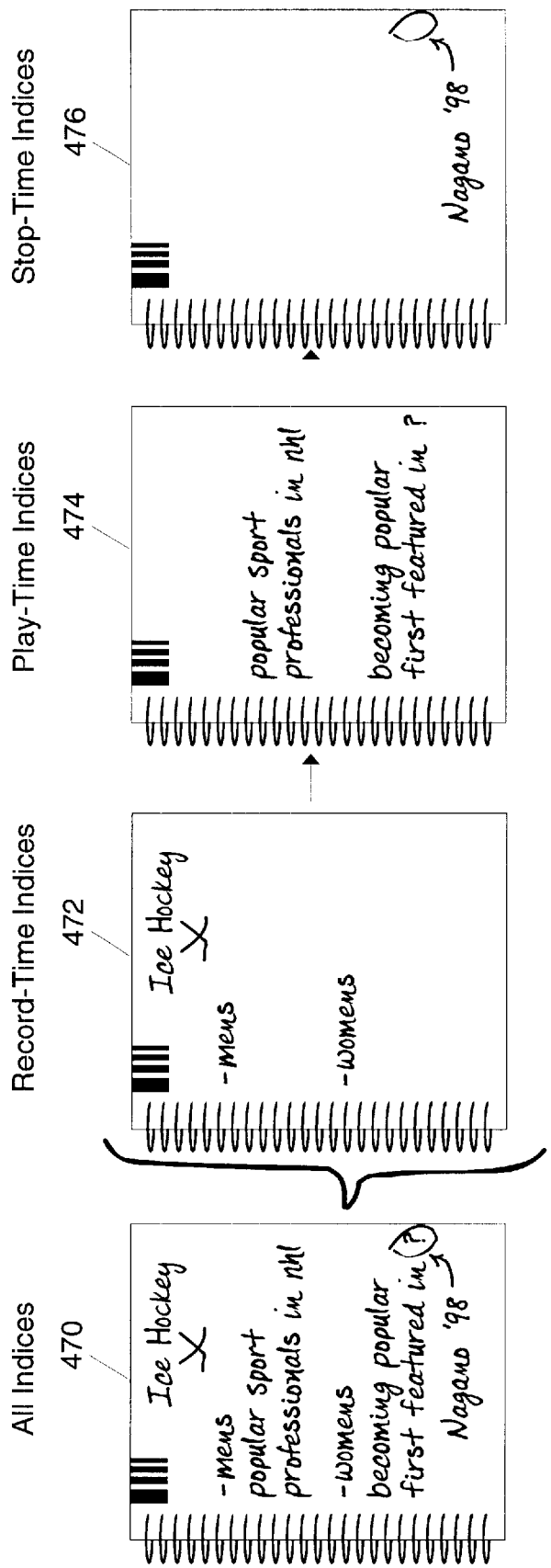
FIG. 3 shows examples of different kinds of recording indices.

FIG. 3 shows an example of a page of notes, distinguishing between three types of recording indices. The drawing shown under the heading "all indices" 470 shows a complete page of notes. This is then broken out into notes that were written during recording (record-time indices 472), notes written during playback (play-time indices 474), and notes written when the system is stopped or idle (stop-time indices 476). In this example, a simple outline was made during recording and filled in with further details during playback, and when stopped. This way, a user does not have to worry about making a notation for every point of interest during recording. Notes can be added at the user's leisure after a recording is made.

In the example shown in FIG. 3, someone is giving a talk about the sport of ice hockey. During recording, the user outlined the topics of the talk—"mens" was written when the lecturer began speaking about men's ice hockey, and "womens" was written when the lecturer began speaking about women's ice hockey. These notes are record-time indices 472 because they were written during recording. After recording the lecture, the user plays it back. During playback, the user makes additional notes. For example, the user writes "nhl" while they are playing back a portion of the lecture about the National Hockey League. This new note now becomes an additional index into the audio recording. The X-Y points that make up the word "nhl" are play-time indices 474 since the note was written during playback. In this case, it indexes a portion of the recording that was not indexed when the recording was originally made (i.e., the part about the NHL). Note that a user can also add a note during playback that indexes something that was already indexed during recording. In this way there can be multiple indices at different locations on a page that index the same time offset in a recording. Lastly, the notation "Nagano '98" was created during stop-time (i.e., stop-time indices 476 the user played a portion of the recording about the 1998 Olympics in Nagano, pressed the stop button 406, and then wrote the note. In one embodiment, notations added when the system is stopped indexes the last portion of the recording that was played or recorded prior to stopping. However, notations made during stop-time may just be used to "touch-up" a note (e.g., dot an "i", cross a "t", or darken light writing). Therefore, in another embodiment, stop-time indices 476 are treated as notations with no associated time index into the recording. Another alternative is to allow a user to selectively enable or disable stop-time indices 476 depending on their usage style.

This invention allows multiple indices to be created for the same information from different locations in notes-the user adds indices simply by making notations anywhere on a page while the multimedia recording is playing or even when it is stopped. There is no limit on the number of indices that can be created.

Indices for each page of notes are updated dynamically. The new X-Y points (446, 448) created during play and stop time are dynamically added to the link table for a given page of notes. Thus, immediately after a stylus stroke is made, it is available as an index for retrieving a portion of the recording (note that each "stroke" is composed of a series of X-Y points (446, 448), and each point has an associated time offset 452).

Figure 4A:
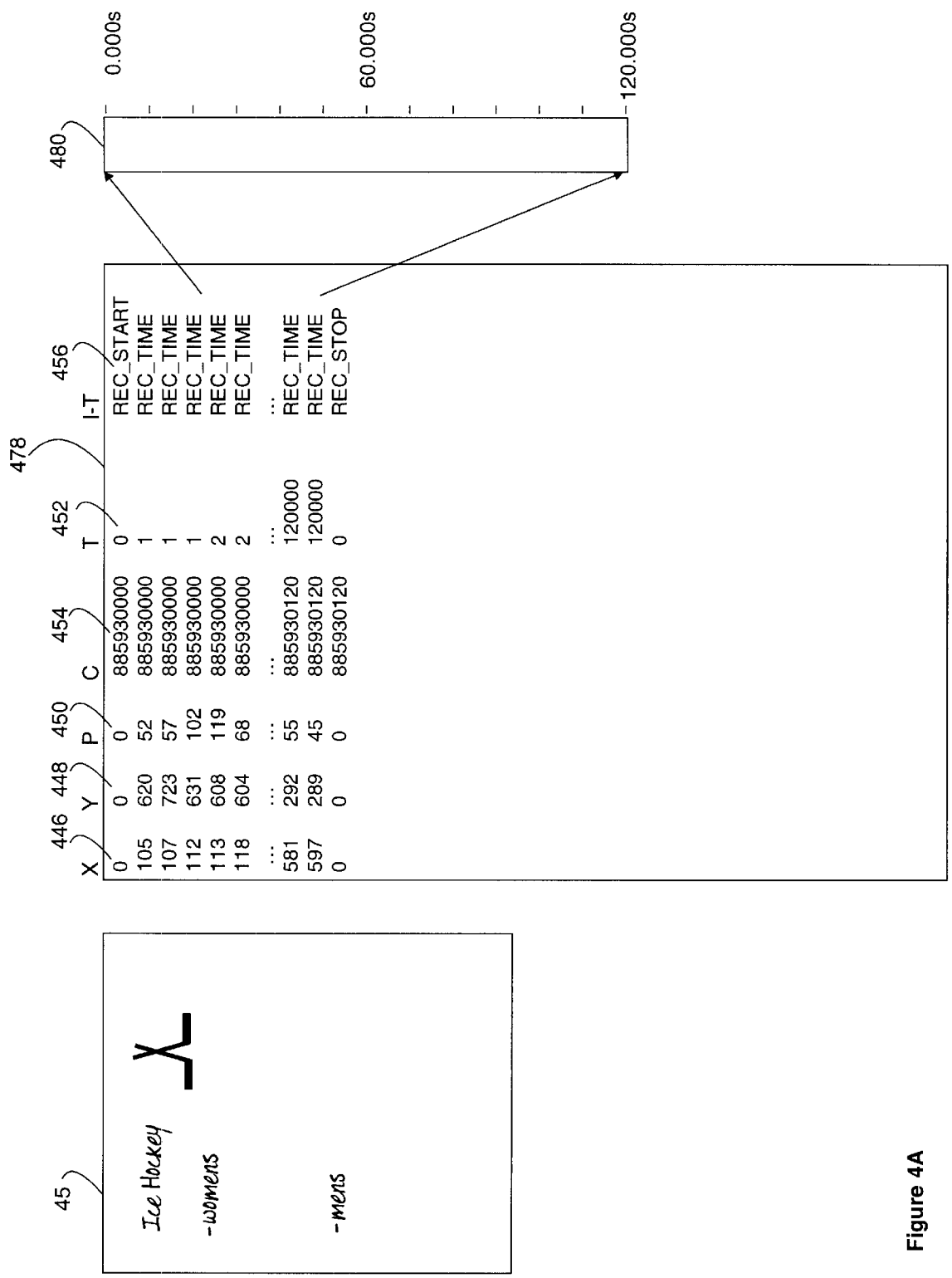
FIG. 4A shows one embodiment of a page, a link table, and a recording illustrating record-time indices.

FIGS. 4A through 4D shows an example of notes taken by someone about a talk on the sport of ice hockey for another embodiment. In FIG. 4A, the user writes the topic "Ice Hockey" at the top of a page 45 along with a small graphic representing crossed hockey sticks. During recording, the user outlined the topics of the talk—"womens" was written when the lecturer began speaking about women's ice hockey, and "mens" was written when the lecturer began speaking about men's ice hockey. These notes are record-time indices because they were created during recording. The link table 478 shows some of the information that is stored. Each line of the table corresponds to a different stylus position on a page 45. In this example, two minutes (120 seconds) of the talk are recorded. In the embodiment shown in FIGS. 4A–4D, it is possible to get multiple stylus strokes in the smallest time offset interval (e.g., one millisecond).

In one embodiment, each of the entries in the table link the writing to a recording 480 of the talk. For example, the first few X-Y points shown occur in the first few milliseconds of the recording, and thus substantially refer to the start of the recording. The last few X-Y points refer to the end of the recording. The links are graphically indicated in FIGS. 4A–4D by arrows pointing from the link table 478 to the recording 480.

Figure 4B:
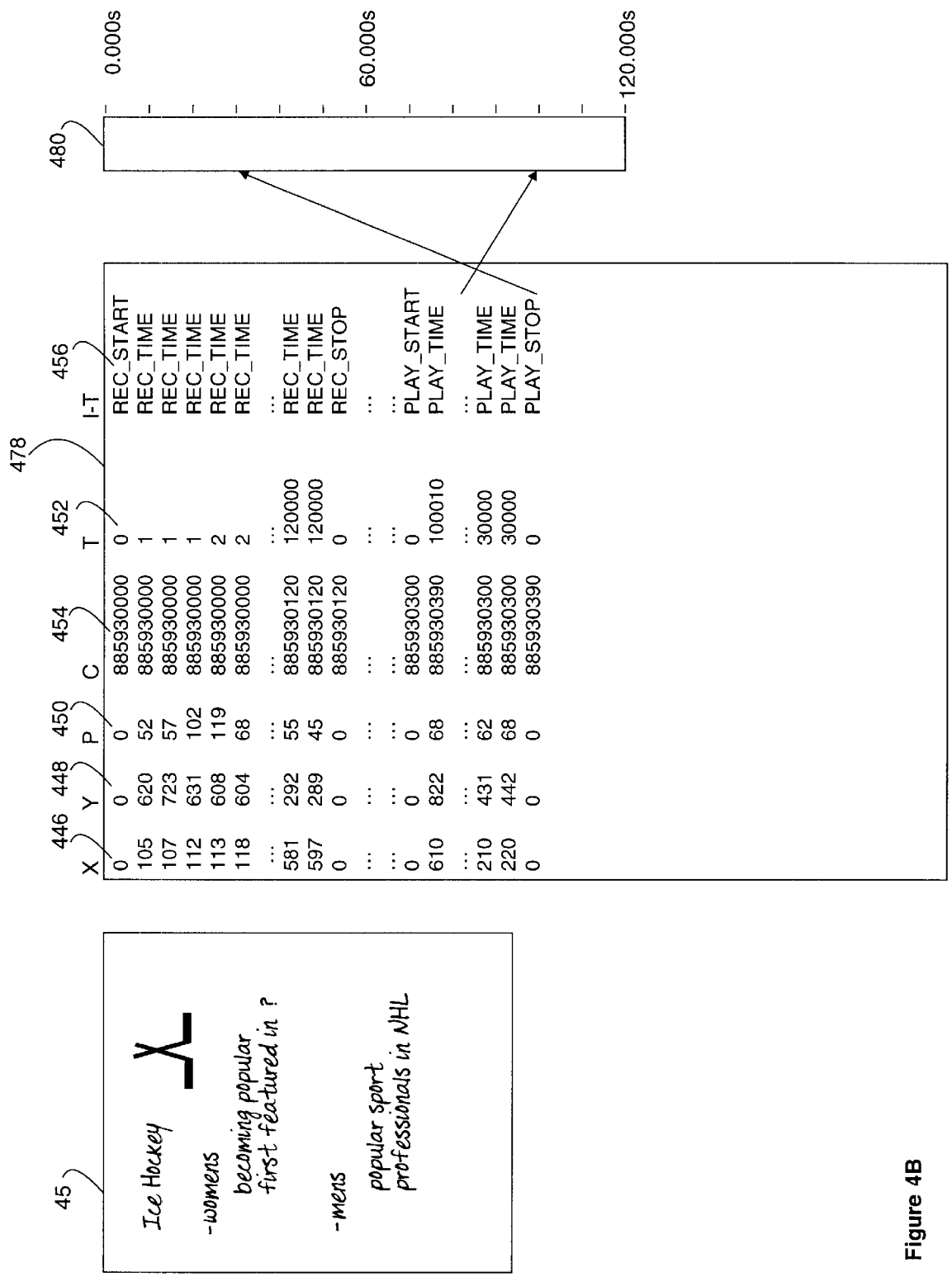
FIG. 4B shows one embodiment of a page, a link table, and a recording illustrating record-time plus play-time indices.

In FIG. 4B, after recording the talk, a user plays it back, and the user makes additional notes filling in the outline. For example, the user writes "nhl" while they are playing back a portion of the lecture about the National Hockey League. This new note now becomes an additional index into the recording. The X-Y coordinates that make up the word "nhl" are play-time indices since the note was written during playback. In this case, it indexes a portion of the recording that was not indexed when the recording was originally made (i.e., the part about the NHL).

Figure 4C:
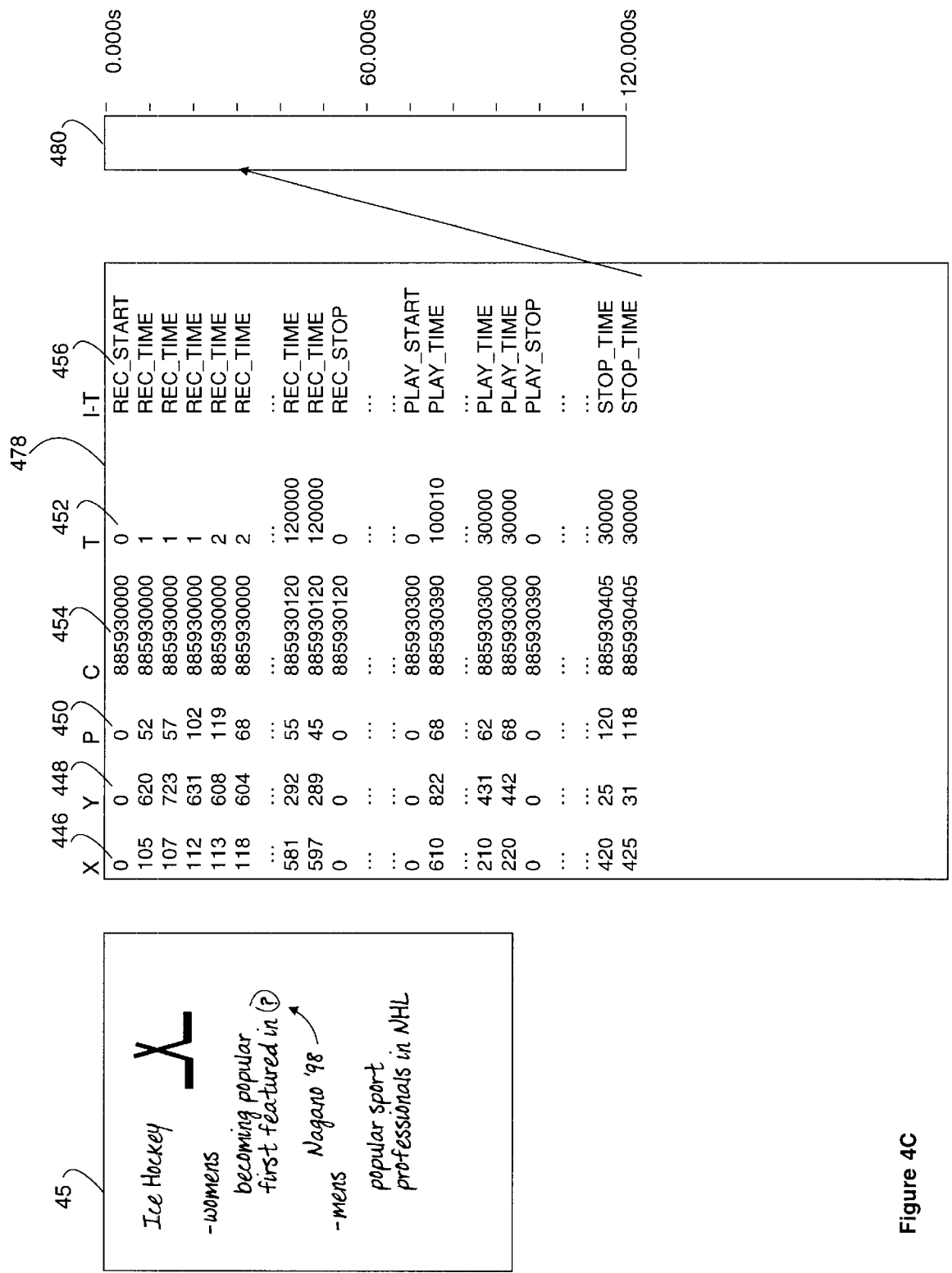
FIG. 4C shows one embodiment of a page, a link table, and a recording illustrating record-time plus play-time, plus stop-time indices.

In FIG. 4C the user makes additional notes. The writing "Nagano '98" was written during stop-time—the user played a portion of the recording about the 1998 Olympics in Nagano, pressed the stop button 406, and then wrote the note. In one embodiment, user notations made when the system is stopped, index the last portion of the recording that was played or recorded prior to stopping.

Figure 4D:
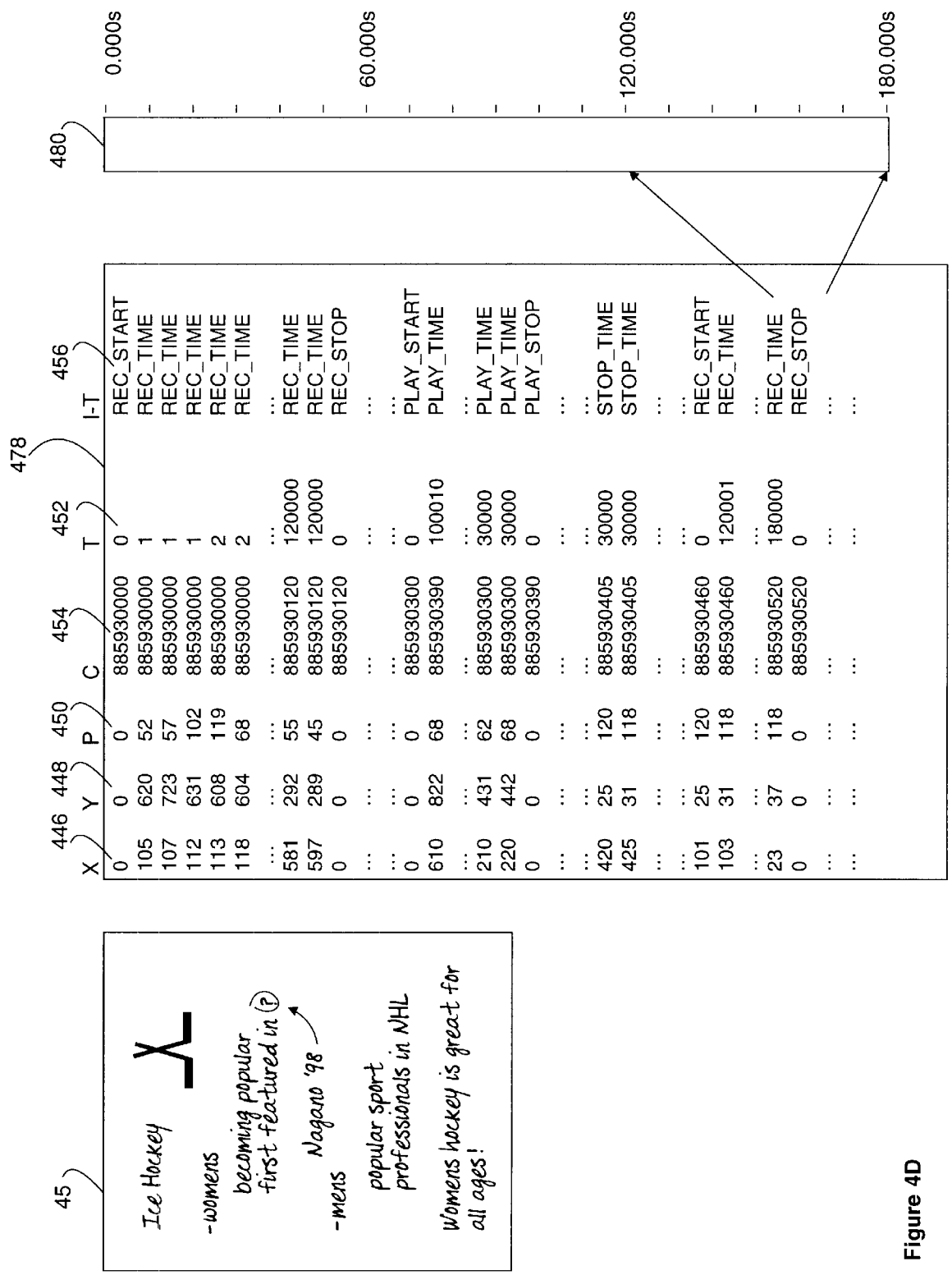
FIG. 4D shows one embodiment of a page, a link table, and a recording illustrating record-time plus play-time, plus stop-time indices with added record-time data.

FIG. 4D shows additional notes and corresponding links that are added when an additional recording segment is appended to the end of the recording for the page 45. The user writes "Womens hockey is great for all ages!" while an additional 60 second recording is made. These record-time indices index this new segment of the recording 480. Selecting on any portion of the handwritten text causes the recording to be played back from the corresponding time offset. For example, if the user selects on the handwritten text "nhl", the recording starts playing at the point where the lecturer began talking about the National Hockey League.

Note that multiple parts of the link table 478 can index the same portion of the recording. FIGS. 4B and 4C show play-time and stop-time indices that both refer to the 30.000 second point in the recording. Multiple play-time or stop-time indices can refer to the same point in the recording. For example, several different play-time indices can each refer to a particular point in the recording that discusses womens ice hockey. Play-time and stop-time indices can also refer to a point already indexed at record-time.

Notetaking

Notes can be written anywhere on any page at any time. The notes do not have to be taken linearly (i.e., from the top to the bottom of the page). A user can start writing at the bottom of a page, move to writing on the top of a page, write from left to right or right to left, etc. Any mark or graphic can be drawn on the paper, or any text in any language. For example, if a circle is drawn on a page, each X-Y point (446, 448) that makes up the circle serves as an index into the recording. The time offset 452 associated with each X-Y point (446, 448) in the circle depends on how fast the circle was drawn.

Storage of Data

In one embodiment of the multimedia recorder, the recordings and link tables are stored digitally on a removable disk. The user inserts a storage disk into the disk drive 414. There is a storage disk associated with each book 17. To eject the disk, a user presses the disk eject button 415. The disk can also be ejected automatically by the system. For example, when the device is shut down, if there is a disk in the drive, it can automatically be ejected.

In another embodiment, the device can store the data in internal flash memory or on a hard drive. Then this data can be transferred to another machine (e.g., desktop or laptop PC) via a Universal Serial Bus (USB), a special docking station, or other means.

Immediate Transition from Recording to Playback

Transitioning from recording to playback is immediate. In other words, immediately after a recording is made, it is available for playback. There is no waiting time between recording and playback. Any processing of the recorded data (e.g., segmentation of the recording into pages) is performed in real-time during recording.

Playing Back a Recording

In one embodiment, there are several controls for controlling playback of the recordings: playback with the selection end of a stylus 531, the play button 405, the stop button 406, the timeline 532, the speed control 412, the play channel selector 413, and the volume control 417.

Playback by Selection on a Note

In order to access a point in a recording associated with a note, the user "selects" on any part of the writing. A selection can be made by pointing at any mark on a page (or circling, or other gesture). Note that because the present invention allows notes written during playback to index a recording, it is necessary to distinguish between writing activity and selections (i.e., to determine whether a user is writing notes or making selections for playback).

FIG. 1D shows two possible embodiments of a stylus 519. In one embodiment, a selection-end 531 of a stylus 519 is pressed down on or pointed at a desired location on a page. The two embodiments of the stylus 519 shown in figure ID from left to right are as follows: a stylus 519 with an ink tip on the writing-end and a button on the selection-end 531, and a stylus 519 with an ink tip on the writing-end 529 and a non-marking tip on the selection-end 531. In these embodiments, the selection-end 531 of the stylus is used to trigger playback from a location on a page. One stylus can be used for both writing and selecting without getting any unwanted pen marks on the page. These embodiments allow for easy distinction between writing and selecting— whenever the writing-end 529 of the stylus 519 makes contact with the page, this is considered writing activity; whenever the selection-end 531 of the stylus 519 makes contact with the page, this is considered selecting. Note that the device can sense the stylus 519 location without making contact with the page. In one embodiment, a pressure reading from the stylus 519 is used to determine if a selection action has been made (i.e., the pressure is above a threshold). Another advantage of this design is that it is easily discoverable and learned by the user. In another embodiment, a single-ended stylus (not shown) can be used where a button on the stylus switches between a writing function and a selectionfunction. In yet another embodiment, the system can distinguish between a writing stylus and a selectionstylus using an identifier communicated from the stylus 519 to the multimedia recorder 61.

When a selection is made, the system then searches for the closest matching stored X-Y location to the selected X-Y location for the page of notes. A matching index must be within a threshold distance from the selection or the system determines that there was no match (e.g., if a blank area of a page is selected). If there is more than one match for a given selection, depending on the use, the earlier or later matching stroke can be used as the index since the order and time of strokes is known. In one embodiment, the earliest matching stroke is used, because subsequent writing over the same area is often used just to "touch up" the writing (e.g., darkening the writing, dotting an "i", crossing a "t", etc.). When multiple matches occur, the system can also select between them based upon the index type (record-time, play-time, or stop-time). For example, a record-time index can be given preference over a play-time index, or vice-versa.

Playback is then started at a point in the recording at or near (e.g., a few seconds prior to) the time offset of the matching X-Y location. Starting playback a few seconds prior to the exact time of the index takes into account a delay between listening and writing during notetaking. This time offset can have a system-defined default (e.g., 3 seconds) which can then be adjusted by a user based on their preference. When the recording is stored digitally, there is no time lag to rewind a tape and access is instantaneous. Playback begins immediately after a selection is made.

Timeline

An active physical scrollbar or timeline 532 acts as both a display and control. The timeline 532 displays a visual representation of the recording. In one embodiment, recordings are segmented by page-the beginning of the timeline 532 represents the beginning (left-hand side) of the page and the end (right-hand side) of the timeline 532 represents the end of a page. A cursor indicator light moves along the timeline 532 as the recording plays. In one embodiment, this indicator light 409 is green to distinguish it from the red record light 403. The cursor indicator light 409 displays the current location in the recording. The cursor 409 stops moving when the stop button 406 is pressed or the recording reaches the end of a page. Any recordings that are added to a page are dynamically added to the timeline 532, and are immediately accessible for playback. During recording, the cursor indicator light 409 is turned off. When the device is not recording, the indicator light 409 is turned on if there is a recording associated with a page of notes.

In one embodiment, a stylus 519 can be dragged along the timeline 532 to continuously adjust the playback position. There is a groove 509 in the timeline for touching or dragging the stylus. As the stylus 519 is dragged along the timeline 532, the cursor indicator light 409 moves along with it. Touching or dragging the stylus 519 to the left of the indicator light 409 moves backward in the recording; touching or dragging to the right of the indicator light 409 moves forward in the recording. Touching the left end of the timeline 532 moves to the beginning of the recording for a page and touching on the right end of the timeline 532 moves to the end of the recording for a page. In one embodiment, when the stylus 519 is dragged or touched along the timeline 532, playback begins once the stylus 519 pressure is released, however, the stylus 519 does not have to be completely removed from contact with the timeline 532. If the device is currently playing when the timeline 532 is touched, the device stops playback, repositions the cursor indicator light 409 and restarts playback from the new position; this transition from the old playback position to the new position in the recording is immediate (i.e., there is no delay to restart playback). If the device is not playing when the timeline 532 is touched, the device repositions the cursor indicator light 409 to the new location (underneath the stylus) and begins playback. Note that a user does not have to push the play button 405 to start playback; playback starts when a user touches or drags on the timeline 532, regardless of whether the device was playing when the touch occurred. This provides a consistent interface because the same result occurs when a user operates the timeline 532 during playback or when playback is stopped.

In the embodiment shown in FIG. 1A, the timeline 532 is oriented horizontally. The orientation of the timeline 532 is significant for several reasons. First, a horizontal layout distinguishes time-based from spatial access to the recording. If the timeline 532 is vertically-oriented, it incorrectly implies a correspondence between each line of text on a page and the adjacent portion of the timeline 532. A second advantage of a horizontally-oriented timeline 532 is that it is equally usable by right-handed and left-handed users.

Play and Stop Buttons

Pressing the play button 405 causes playback to begin from the recording position shown by the cursor indicator light 409. Pressing the stop button 406 stops recording or playback. If the play button 405 is pressed during recording, recording is stopped and playback is begun.

When a user first turns to a page, the position of the recording (shown by the cursor indicator 409) is set to the beginning of the timeline 532 (indicating the beginning of the page). Let's say the recording begins playing and the user presses the stop button 6 after listening to 10 seconds. When the user presses the play button 405 again, playback will begin where it previously left off—starting at 10 seconds into the recording for the page. The stop button 406 can be thought of like a "pause" function since it retains the user's position in the recording. However, the design is simplified, because no pause button is needed. When playback reaches the end of a recording for a page, it stops automatically. If the play button 405 is pressed after this, playback starts back at the beginning of the recording for the page.

Speed Control

The speed of playback can be increased or decreased interactively with the playback speed control 412 while playing or when playback is stopped. The speed can be increased up to at least 2.5 times the original and slowed down to at least 0.5 times the original. The change in speed is accomplished without changing the pitch or disturbing the sound quality using techniques known in the art. When the speed is changed during playback, the changes take effect quickly so the control is very responsive.

In one embodiment, the speed control is a physical slider. The slider can be oriented horizontally or vertically. In one embodiment, the speed control is oriented vertically—moving the slider down causes the playback speed to decrease; moving the slider up causes the speed to increase. In another embodiment, a circular control (thumb wheel, knob, etc.) can be used to adjust the speed or any control that allows continuous movement between the slowest and fastest speeds. A control could also be designed to be operated with the same stylus 519 used for writing. However, a finger-operated control allows two-handed operation. For example, a user can write with one hand, while changing the speed with another. The use of a physical speed control is advantageous because it shows its current state (i.e., current speed) upon visual inspection. A physical control also gives tactile feedback—the control cannot be pushed (or turned, etc.) any further after reaching the maximum speed in one direction (i.e., fastest speed) or the other (i.e. slowest speed).

In the one embodiment, the speed control 412 uses a non-linear mapping of speed control positions to speed values. More space (i.e., finer granularity) is allocated for fast speeds than for slow speeds. In addition, extra space is allotted for "normal" or the original recording speed so this is easy to select. In an alternative embodiment, a physical detent can be used to indicate the normal speed position (or other selected speeds). This tactile feedback allows the control to be used without looking directly at it; users can retain visual focus on their notes while manipulating the speed control 412.

Play Channel Selector

One or more channels (or "tracks") can be recorded, and played back individually or in combination. In one embodiment of a play channel selection control 413, a user can select between three options: (1) playing channel one of the recording only, (2) channel two only, or (3) both channels. In one embodiment, a multi-position switch is used so that the control shows its current state upon visual inspection.

This feature can have a number of different uses. One use is for recording content that is being simultaneously translated. For example, the original language can be recorded on channel one, and the simultaneous translation can be recorded on channel two (and so forth for more channels). Afterwards, a user can select to playback channel two to hear the translation or channel one to hear the original language. This enables a user to check for translation errors, or hear how something was originally spoken (e.g., how loud or soft, etc.). Another example of multi-channel recording is for using different microphones for capturing different speakers.

Powering the Device Battery Operation and Display

A power on/off switch 420 is also provided for turning on and off the multimedia recorder 61. The device can be powered off a wall outlet or using a battery. When powered off the wall, a power plug is inserted into the external power input jack 421. If battery-powered, a battery is inserted into the battery input bay 422. When the device is powered off the battery, the amount of battery time remaining is shown on the status display 401. In one embodiment, the battery time is displayed in terms of the amount of continuous recording or playback time available in hours and minutes remaining. This is useful when a known amount of time is needed for recording (e.g., a two hour lecture is to be recorded, so two hours of battery are needed for continuous recording). To shutdown the multimedia recorder 61, the user presses and holds down the shutdown button 411.

Storage Space Display

In one embodiment, the device displays the amount of storage space available in terms of hours and minutes of recording time available (rather than the raw number of bytes available). The device takes into account the number of channels to be recorded. For example, a two channel recording takes up twice the storage space as a one channel recording. This way prior to recording, users know exactly how long they can continue to record to the disk (or other storage media) they are using.

Hardware Description

Figure 5:
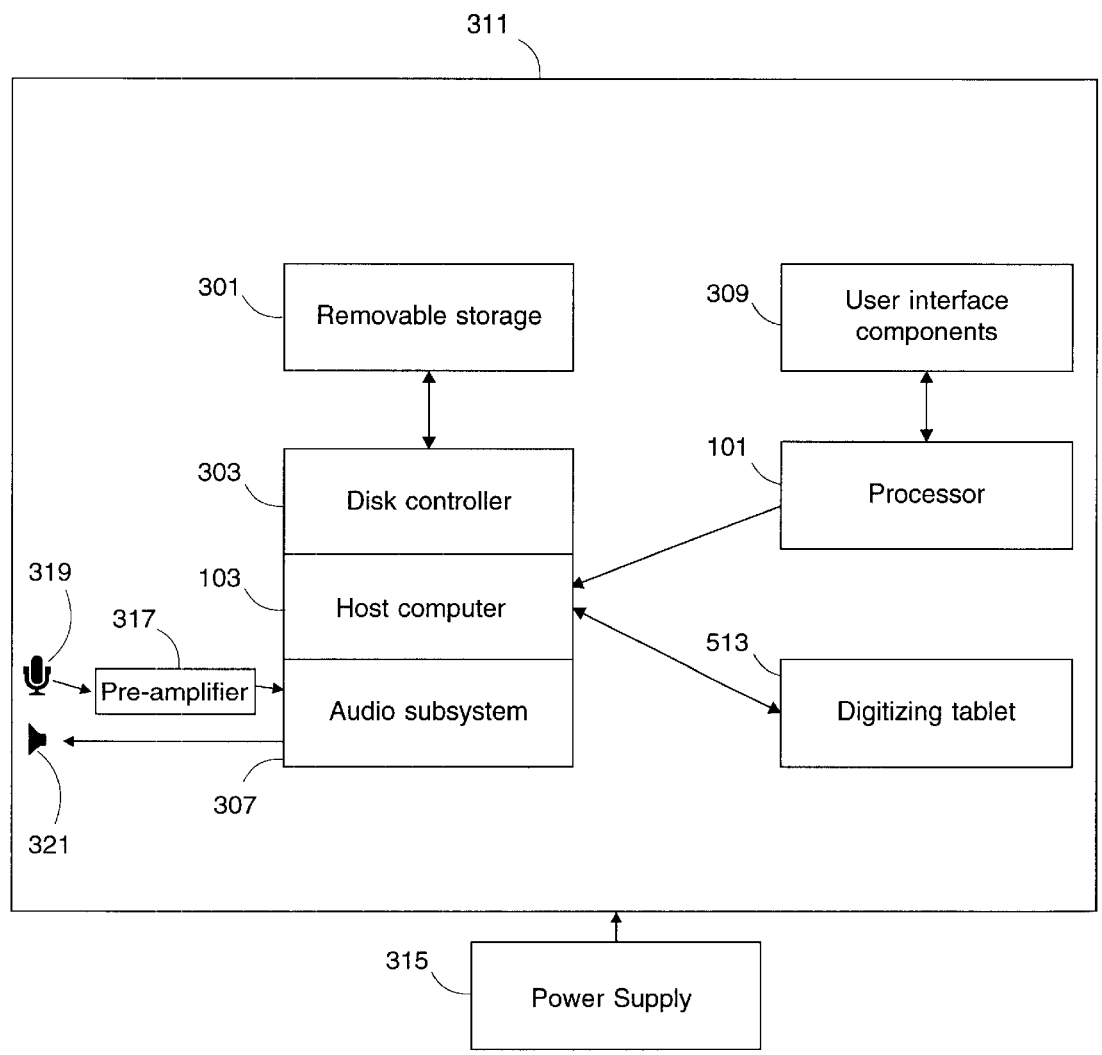
FIG. 5 shows a block diagram of the hardware components.

FIG. 5 shows a block diagram of the hardware components for one embodiment of a multimedia recorder 61. In one embodiment, the multimedia recorder 61 has a host computer 103 that communicates with a variety of other devices. The host computer 103 contains a central processing unit (CPU), random access memory (RAM), serial input/output ports, a bus for communicating with other components, etc. The host computer 103 can "boot" itself off of an internal or external flash memory unit, or by other means.

An audio subsystem 307 communicates to the host computer 103. The audio subsystem 307 plays and records audio by using analog-to-digital and digital-to-analog converters, or a codec (coder-decoder). The audio subsystem 307 connects to microphone 319 or line level inputs (the output of 317), and speaker or line level outputs 321. Microphone level inputs 319 can be amplified to line level through the use of an optional external pre-amplifier 317 and connected to the line level input connectors of the audio subsystem 307.

The host computer 103 reads and writes data to a removable storage unit 301 (such as a magnetic disk, a magneto-optical disk, or solid state storage module). The host computer 103 communicates to the removable storage unit 301 through a disk controller unit 303 (such as SCSI) or the disk controller 303 may be built directly into the host computer 103 (such as IDE).

Stylus 519 location data (e.g., X-Y location, pressure, tilt, etc.) from a digitizing tablet 513 (such as with a commercially available tablet from Wacom Technology Corp.) is communicated to the host computer 103 through a serial (RS-232) or parallel port.

A power supply 315 provides electrical power to the system components 311. The power supply 315 can be run off of an internal or external battery, wall power adapter, etc. An internal battery can be charged by the power supply 315.

Figure 6:
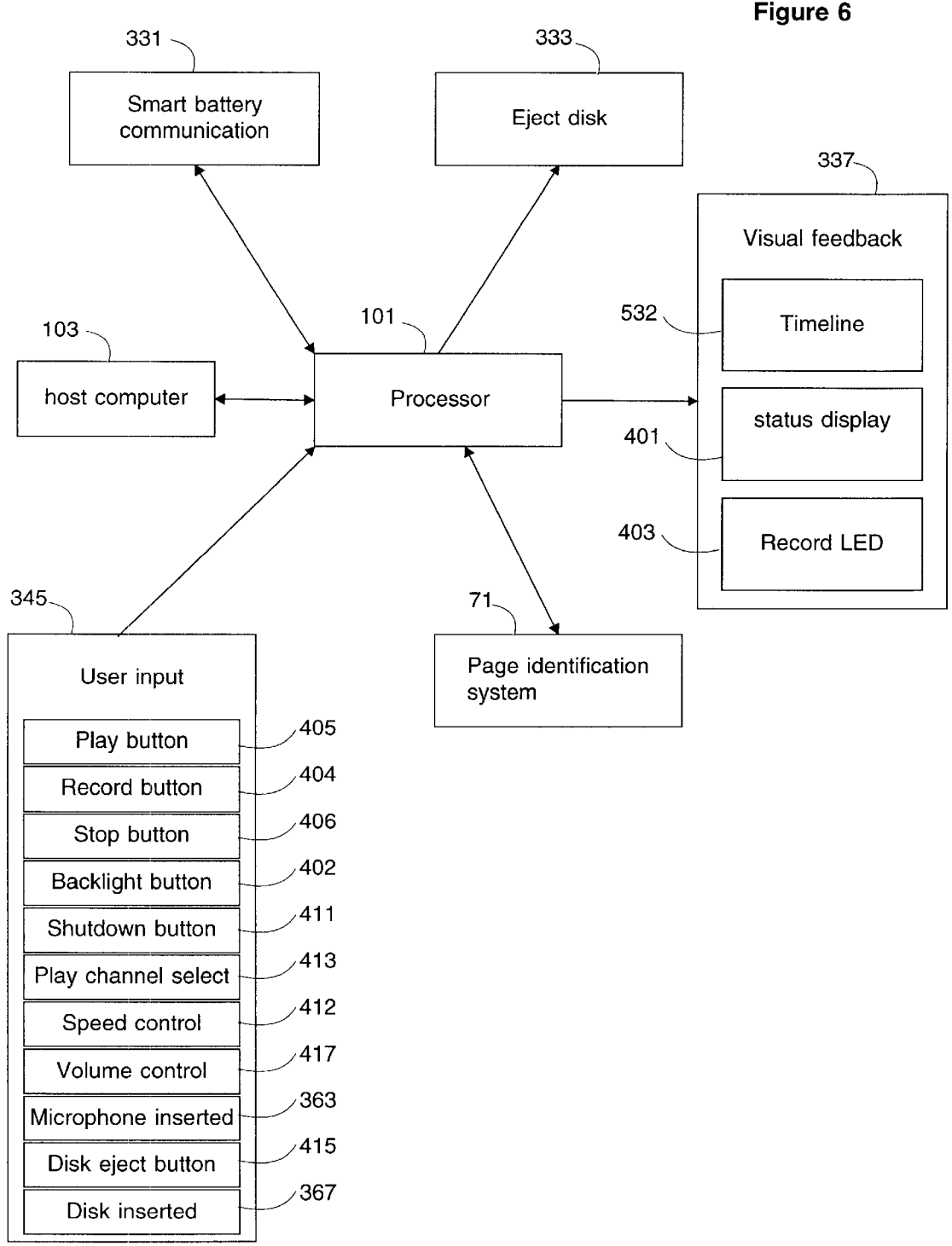
FIG. 6 shows a block diagram of the microcontroller and user interface components.

The host computer 103 communicates with a processor 101 (such as a Motorola MC68HC11) that monitors and controls a variety of user interface components 309. FIG. 6 shows a block diagram of the processor 101 and user interface components 309. The host computer 103 and processor 101 communicate through a serial or parallel port. The processor 101 reduces the load on the host computer 103 by monitoring the status of various user inputs 345 (e.g., buttons, analog inputs, etc.), and sends this information to the host computer 103 when there is a change of state in the user input 345. The processor 101 also translates data from the host computer 103 and displays it to the user. The processor 101, for example, can take a text string sent by the host computer 103 and cause it to be displayed on the status display 401 by manipulating parallel control lines to the display.

The processor 101 gathers information from buttons (e.g., play 405, record 404, stop 406, backlight 402, shutdown 411, play channel select 413, disk eject 15, etc.), analog inputs (e.g., potentiometers used for the playback speed control 412 and the volume control 417), the state of input jacks (e.g., if something is inserted into or removed from a microphone jack 363), the state of other systems (e.g., if a storage cartridge in inserted into the removable storage drive 367), etc.

The processor 101 also controls visual feedback 337 by receiving commands from the host computer 103. The processor 101 drives control lines for the light emitting elements in the timeline 532, the record LED 403, the status display 401 and related backlight, etc.

Under control from the host computer 103, the processor 101 can send a signal to the removable storage drive 301 to eject the storage disk 333 or other medium.

The processor 101 also controls and reads data from the optical sensor used in the page identification system 71 and can communicate with a "smart" battery 331 using a "system management bus". The processor 101 can thus get status information from the battery (e.g., state of charge) and communicate it to the host computer 103.

The processor 101 is programmed in software, and operates in both an interrupt-driven and polled manner. Interrupts are generated when incoming communication is received from the host computer 103 or when buttons are pushed. In addition, the processor 101 polls some input devices 345 (e.g., potentiometers, and some switches), and also polls the state of charge from the "smart" battery 331 and the page identification subsystem 343.

While the invention has been shown and described with reference to the embodiments, it should be understood by those skilled in the art that various changes in form and detail may be made therein without departing from the spirit and scope of the invention.

We claim:

1. A system for linking a user notation on a page to time-varying data, comprising:
    a user interface for capturing user notations made on the page during record-time and play-time;
    a user interface for capturing attribute data for each user notation made on the page during record-time and play-time;
    a recording device for recording time-varying data substantially corresponding to the attribute data for the page; and
    a processor for dynamically linking the attribute data for each user notation made on the page to a substantially corresponding element of the time-varying data.

2. The system in accordance with claim 1, wherein the attribute data is stored in a first memory location and the time-varying data is stored in a second memory location.

3. The system in accordance with claim 1, wherein the user interface captures attribute data for user notations made on the page during stop-time.

4. The system in accordance with claim 1, wherein the attribute data comprises location, time, and index-type information.

5. The system in accordance with claim 1, wherein the user interface comprises:
   a stylus for making the user notation on the page;
   a digitizing tablet coupled to the stylus for capturing attribute data for each user notation; and
   a memory coupled to the digitizing tablet for storing the attribute data.

6. The system in accordance with claim 5, wherein the stylus comprises:
   a writing end for making user notations on the page; and
   a selection end for selecting the user notation on the page.

7. The system in accordance with claim 1, wherein the processor uses time offset data to dynamically link the attribute data for each user notation to the substantially corresponding element of the time-varying data.

8. A system for linking a handwritten notation on a page to time-varying data, comprising:
   a stylus for making a handwritten notation on the page;
   a digitizing tablet coupled to the stylus for capturing the handwritten notation;
   a recorder for recording the time-varying data during record-time and for reproducing an element of the recorded time-varying data in response to a selection by the stylus of the substantially corresponding handwritten notation during play-time; and
   a processor for linking the handwritten notation made on the page to the substantially corresponding element of the time-varying data recorded during record-time and for linking a new handwritten notation made during play-time to the substantially corresponding time-varying data recorded during record-time.

9. The system in accordance with claim 8, wherein the stylus comprises:
   a writing end for making the handwritten notation on the page; and
   a selection end coupled to the digitizing tablet for selecting the handwritten notation on the page.

10. The system in accordance with claim 8, wherein the recorder comprises:
    a sensory device for receiving the time-varying data; and
    a storage device coupled to the sensory device for storing the time-varying data.

11. The system in accordance with claim 8, wherein the processor is coupled to the digitizing tablet and the recorder for linking attribute data received by the digitizing tablet for the handwritten notation made on the page to the substantially corresponding element of the time-varying data recorded by the recorder.

12. The system in accordance with claim 11, wherein the attribute data comprises location data for the handwritten notation, pressure information from the stylus when making the handwritten information, time when the handwritten notation was made, and play-time and record-time indicia.

13. The system in accordance with claim 8, wherein the time-varying data reproduced during play-time and linked to a substantially corresponding handwritten notation can be at an earlier time offset than the time-varying data recorded when the handwritten notation was made during record-time.

14. The system in accordance with claim 8, wherein the processor links attribute data corresponding to the new handwritten notation made during play-time to the element of time-varying data reproduced when the new handwritten notation was made.

15. A method for linking a user notation on a page to time-varying data, comprising the steps of:
    capturing user notations made on the page during record-time and play-time;
    capturing attribute data for each user notation made on the page during record-time and play-time;
    recording time-varying data substantially corresponding to the attribute data for the page; and
    dynamically linking the attribute data for each user notation made on the page to a substantially corresponding element of the time-varying data.

16. The method in accordance with claim 15, wherein the step of capturing attribute data for each user notation made on the page comprises sensing the attribute data from a stylus when making the user notation and storing the attribute data into a memory.

17. The method in accordance with claim 16, wherein the step of capturing attribute data comprises storing location and pressure information from the stylus and storing time and index-type information when the user notation was made.

18. The method in accordance with claim 15, wherein entering play-time and capturing play-time attribute data comprises:
    reproducing the time-varying media recorded during record-time;
    adding a new user notation onto the page; and
    linking the new user notation to a substantially corresponding element of the time-varying data.

19. The method in accordance with claim 15, wherein the recording step comprises:
    digitizing time-varying data corresponding to the user notations made onto the page; and
    storing the digitized time-varying data in a memory.

20. The method in accordance with claim 15, wherein the dynamically linking step comprises:
    storing a time offset as part of the attribute data corresponding to the user notation; and
    linking the time offset to the time-varying data playing at about the same time that the user notation was made.

21. The method in accordance with claim 15, further comprising the steps of selecting a page;
    recording a new element of time-varying data;
    linking the new element of time-varying data to the selected page; and
    repeating the steps of capturing attribute data, recording time-varying data, and dynamically linking the attribute data for each user notation made on the selected page corresponding to the new element of time-varying data.

22. A method for linking handwritten notations on a page to time-varying data, comprising the steps of:
    making handwritten notations on the page with a stylus;
    capturing each such handwritten notation made onto the page with a sensing device coupled to the stylus;
    recording the time-varying data with a recording mechanism during record-time;
    linking each such handwritten notation made on the page to a substantially corresponding element of the time-varying data recorded during record-time;

reproducing an element of the recorded time-varying data in response to a play-time selection of the corresponding handwritten notation; and adding a new handwritten notation onto the page during play-time and linking the new handwritten notation to the substantially corresponding time-varying data recorded during record-time.

23. The method in accordance with claim 22, wherein the step of capturing the handwritten notation comprises:

sensing location, time, and index-type attribute data when making the handwritten notation on the page; and storing the attribute data in a memory.

* * * * *